United States Patent [19]

Schuster et al.

[11] Patent Number: 5,390,942
[45] Date of Patent: Feb. 21, 1995

[54] BRAKE ASSEMBLY FOR SHOPPING CARTS

[76] Inventors: Mary R. Schuster; Reinhard Schuster, both of 2210 Whitney Pointe Dr., Chesterfield, Mo. 63005-4515

[21] Appl. No.: 163,087

[22] Filed: Dec. 7, 1993

[51] Int. Cl.⁶ ............................................. B62B 5/04
[52] U.S. Cl. ................... 280/33.994; 280/19
[58] Field of Search ......... 280/33.994, 47.38, DIG. 4; 180/2 D, 19, 29; 16/35 R

[56] References Cited

U.S. PATENT DOCUMENTS

| | | | |
|---|---|---|---|
| 141,236 | 7/1873 | Robertson . | |
| D. 288,285 | 2/1987 | Simmons | D8/375 |
| 2,572,548 | 10/1951 | Weisz et al. | 16/35 R |
| 2,591,524 | 4/1952 | Douglas et al. | 188/29 X |
| 2,639,785 | 5/1953 | Vickers | 188/29 |
| 2,709,828 | 6/1955 | Noelting et al. | 16/35 R |
| 2,740,643 | 4/1956 | Gordon et al. | 280/47.38 X |
| 3,066,764 | 12/1962 | Clinton et al. | 188/74 |
| 3,095,211 | 6/1963 | Altherr | 280/33.994 |
| 3,117,653 | 1/1964 | Altherr | 188/74 |
| 3,493,085 | 2/1970 | Libhart | 188/74 |
| 3,687,241 | 8/1972 | Fontana | 188/74 |
| 3,881,216 | 5/1975 | Fontana | 16/35 R |
| 3,992,038 | 11/1976 | Guadano, Sr. | 280/659 |
| 4,084,663 | 4/1978 | Haley | 188/31 |
| 4,976,447 | 12/1990 | Batson | 280/33.994 |
| 5,042,622 | 8/1991 | Smith et al. | 188/1.12 |
| 5,236,066 | 8/1993 | O'Neal et al. | 280/33.994 X |

FOREIGN PATENT DOCUMENTS

| | | | |
|---|---|---|---|
| 3034254 | 4/1982 | Germany | 280/47.38 |
| 2171160 | 8/1986 | United Kingdom | 280/47.38 |
| 2243198 | 10/1991 | United Kingdom | 280/47.38 |
| 2256685 | 12/1992 | United Kingdom | 280/47.38 |

OTHER PUBLICATIONS

Newspaper article discussing Saf-T-Loc Brake, manufactured by Angeles Group of Pacific, Mo., St. Louis Post Dispatch, Circa 1993.

*Primary Examiner*—Brian L. Johnson
*Attorney, Agent, or Firm*—Senniger, Powers, Leavitt & Roedel

[57] ABSTRACT

A brake assembly for a shopping cart having a frame, a basket mounted on the frame, front and rear wheels supporting the frame and basket for movement across a surface, and a handle for gripping to move the shopping cart across the surface, the brake assembly comprises a brake shoe having a unitary construction and being sized and arranged for simultaneously applying a braking force to both of the rear wheels of the shopping cart. The brake shoe includes elongate lever arms pivotally mounted on the frame and having upper and lower end portions, an elongate actuator bar extending generally laterally of the upper end portions of the lever arms, and braking bars extending generally laterally of the lower end portions of the lever arms in proximity to the rear wheels. The brake assembly further includes a pedal pivotally mounted on the frame and a cam connecting the pedal to the actuator bar of the brake shoe. The cam is operable upon actuation of the pedal to swing the brake shoe on the lever arms between an unbraked position in which the braking bars are simultaneously spaced from the rear wheels to permit free rotation of the rear wheels, and a braked position in which the braking bars simultaneously engage the rear wheels and apply a braking force thereto to prevent movement of the shopping cart.

23 Claims, 4 Drawing Sheets

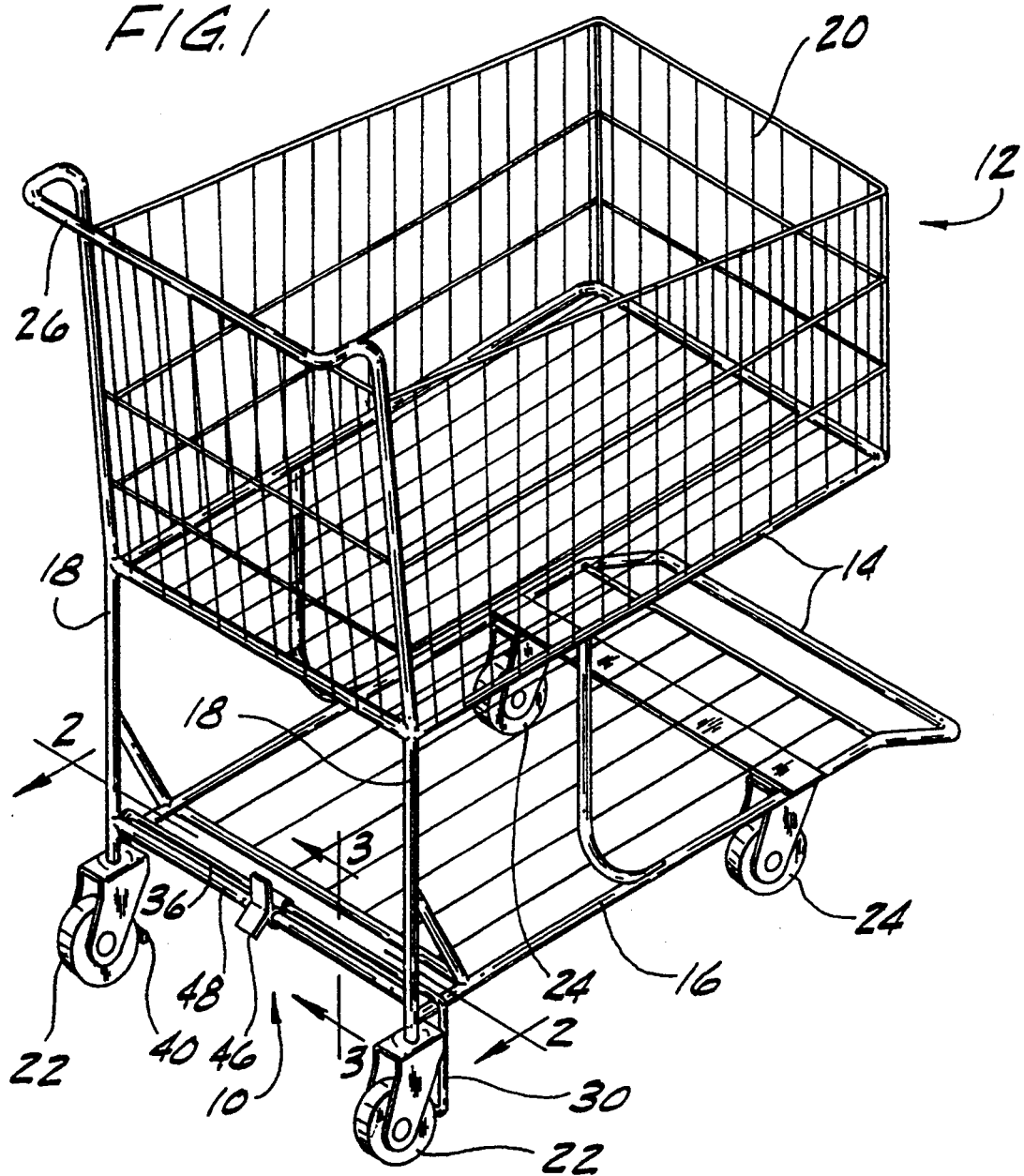

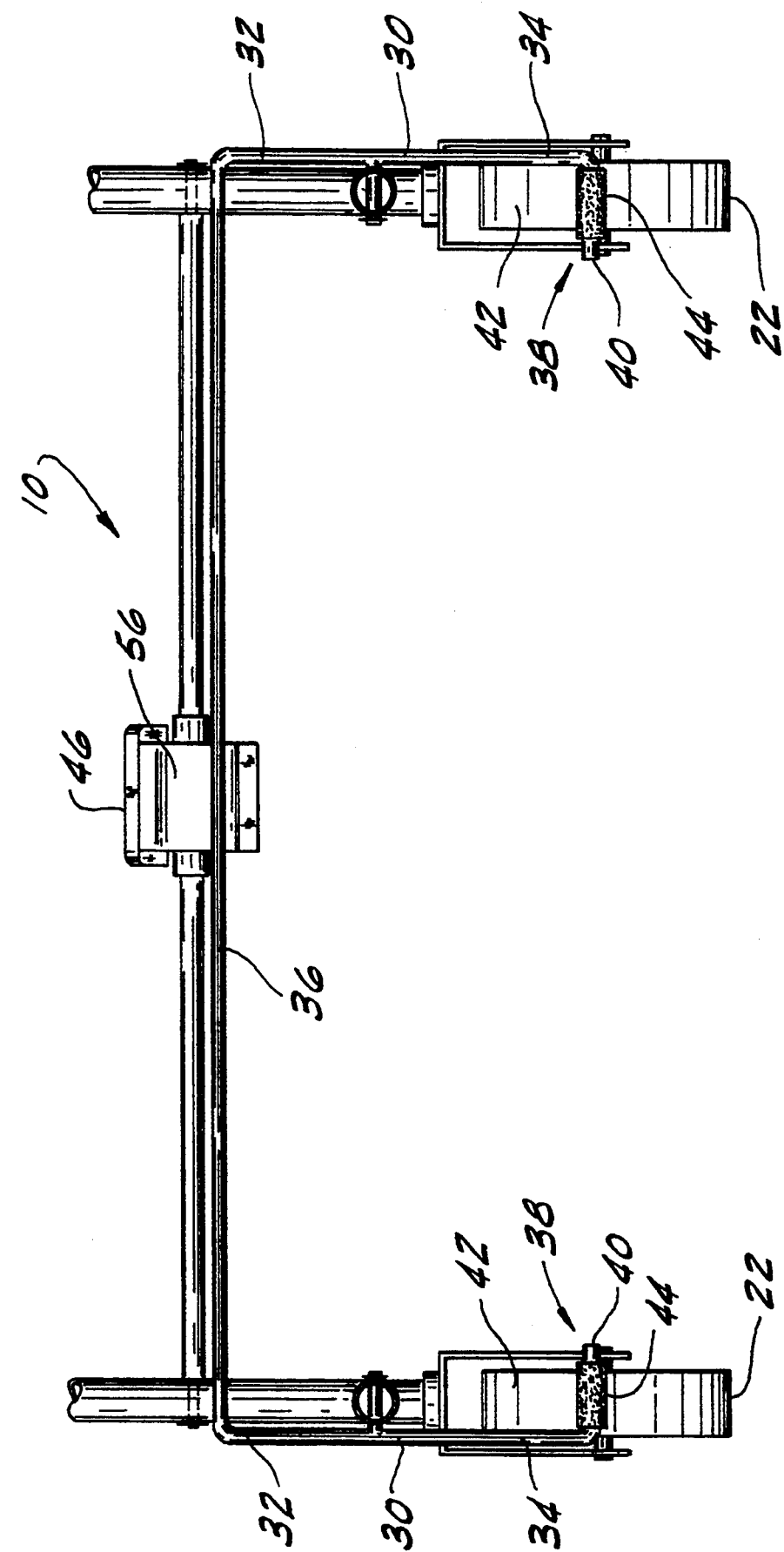

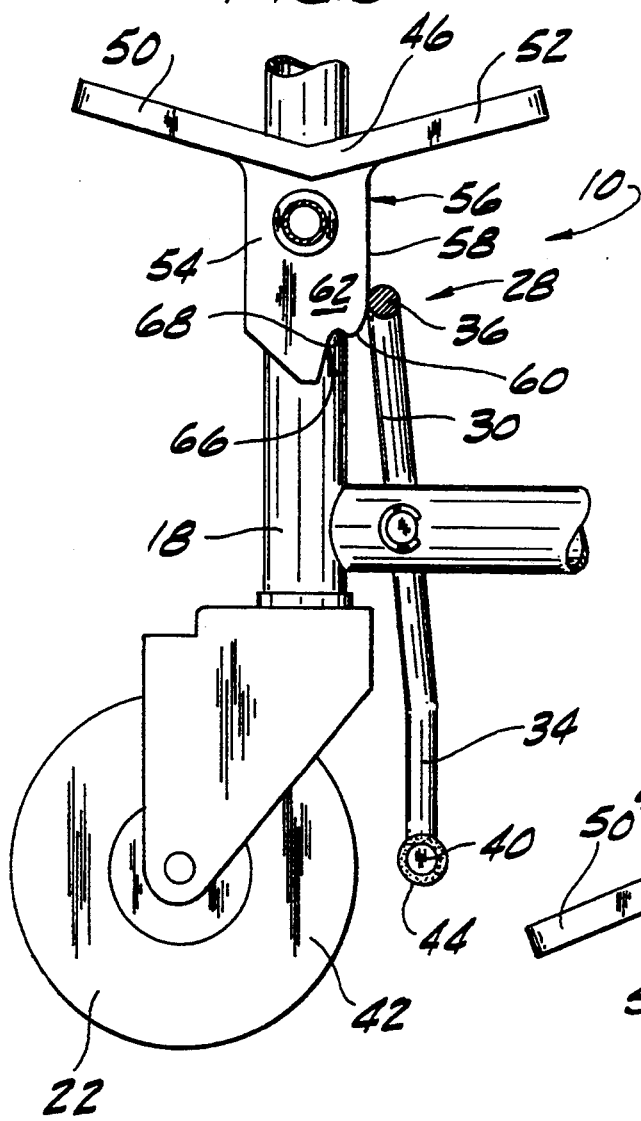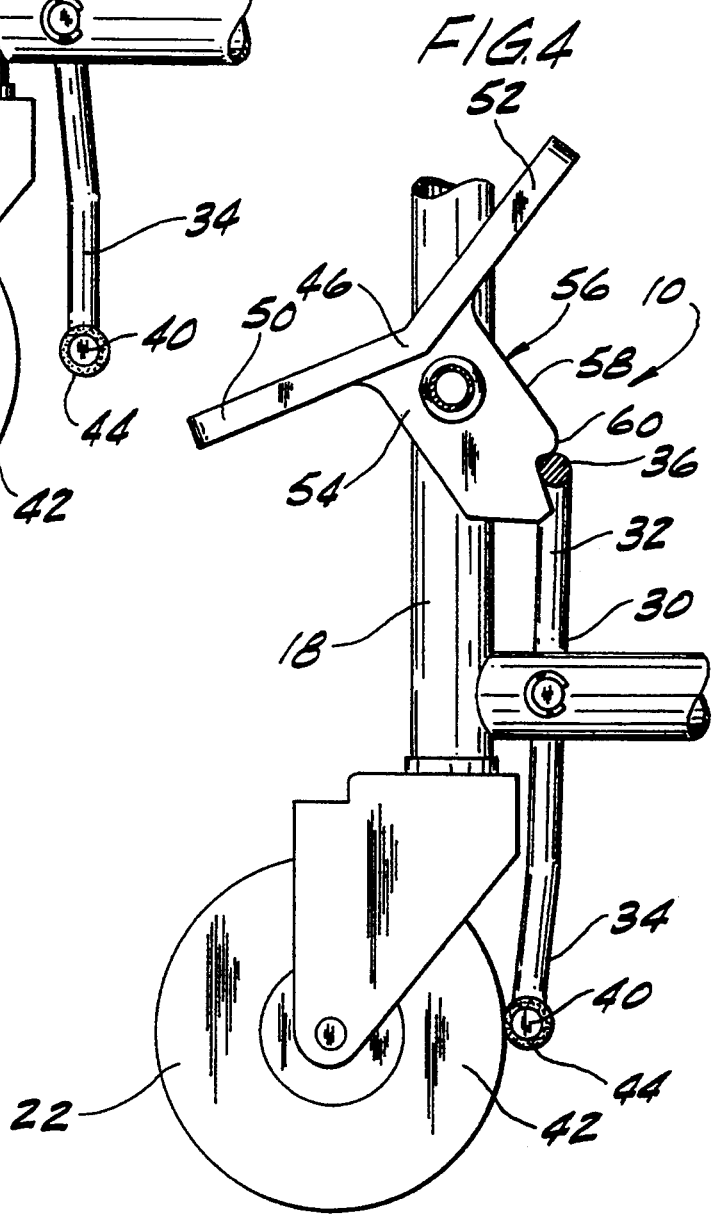

BRAKE ASSEMBLY FOR SHOPPING CARTS

BACKGROUND OF THE INVENTION

This invention relates generally to brake assemblies and, more particularly, to a brake assembly for shopping carts.

Shopping carts have for many years provided a great convenience to customers of grocery stores, discount stores and the like. Typically, shopping carts are constructed with four freely rotating wheels, two of which are casters to permit the cart to roll and turn easily. However, although this construction greatly enhances maneuverability of the cart, it becomes a drawback in situations where it is desirable to maintain the cart in a fixed location. Typically, this occurs when the cart is being unloaded in the parking lot. Where the lot is not level, the carts tend to turn and roll down the slope, posing a hazard to automobiles, other persons in the parking lot, and even to small children who may be riding in the cart. Even if the lot is level, forces applied to the cart by the wind or by the customer as the groceries or other items in the carts are lifted out may cause the cart to roll or turn into an adjacent automobile.

U.S. Pat. Nos. 3,117,653; 4,976,447; and 5,042,622 all disclose brake assemblies to prevent the "run-away" cart problem. However, to be effective used in operation the brake assembly must, besides simply restraining the cart from movement, be economical to manufacture, easy to install both during assembly of the cart and when retrofitting existing carts and easy to operate. Simplicity of structure and ease of operation are the key for designing an effective brake assembly for shopping carts.

The prior brake assemblies are either flawed in solving the "run-away" cart problem or are deficient in the ease of manufacture, installation and use of the carts. A problem with some prior art brake assemblies is that the brake system restrains only one of the rear wheels which still allows the cart to spin around the one locked wheel potentially causing damage. Therefore to significantly reduce property damage and injuries, an effective brake assembly should restrain both rear wheels from rotating thereby equipping the operator with full control over the cart. In the existing dual wheel braking systems, separate actuation of a brake for each wheel is often required. Where both wheels are simultaneously braked by action of a single actuator, a linkage is used which has several moving parts which would be expensive to make, difficult to retrofit on carts not already having brakes, and more subject to failure due to the number of moving parts.

Thus, among the several objects and features of the present invention may be noted the provision of a brake assembly for a shopping cart which is sized and arranged for simultaneously applying a braking force to both of the rear wheels of the shopping cart with one-step activation; the provision of such a brake assembly which locks the brake shoe in braking position until disengaged; the provision of such a brake assembly which has a minimum of parts; the provision of such a brake assembly in which the moving parts are located away from fingers, legs and feet; the provision of such a brake assembly which can be factory installed or retrofitted to a retailer's existing fleet of carts; and the provision of such a brake assembly which is inexpensive to manufacture and easy to use.

Generally, a brake assembly of the present invention is adapted for use on a shopping cart having a frame, a basket mounted on the frame, front and rear wheels supporting the frame and basket for movement across a surface, and a handle for gripping to move the shopping cart across the surface. The brake assembly comprises a brake shoe having a unitary construction and being sized and arranged for simultaneously applying a braking force to both of the rear wheels of the shopping cart. The brake shoe includes elongate lever means pivotally mounted on the frame and having upper and lower end portions, an elongate actuator bar extending generally laterally of the lower end portions of said lever means the upper end portions of the lever means, and elongate wheel engaging means extending generally laterally of the lower end portions. The brake assembly further comprises a pedal pivotally mounted on the frame and linkage means connecting the pedal to the actuator bar of the brake shoe. The linkage means is operable upon actuation of the pedal to swing the brake shoe on the lever means between an unbraked position in which the wheel engaging means is simultaneously spaced from both of the rear wheels to permit free rotation of the rear wheels, and a braked position in which the wheel engaging means simultaneously engages the rear wheels and applies a braking force thereto to prevent movement of the shopping cart.

Other objects and features will be in part apparent and in part pointed out hereinafter.

BRIEF DESCRIPTION OF THE DRAWINGS

FIG. 1 is a perspective view of a shopping cart equipped with a brake assembly of the present invention;

FIG. 2 is a fragmentary vertical section taken along line 2—2 of FIG. 1 showing the brake assembly;

FIG. 3 is a fragmentary vertical section taken along line 3—3 of FIG. 1 showing the brake assembly in the unbraked position;

FIG. 4 is the fragmentary vertical section of FIG. 3, but showing the brake assembly in the braked position;

Corresponding reference characters indicate corresponding parts throughout the several views of the drawings.

DETAILED DESCRIPTION OF A PREFERRED EMBODIMENT

Figure 5:
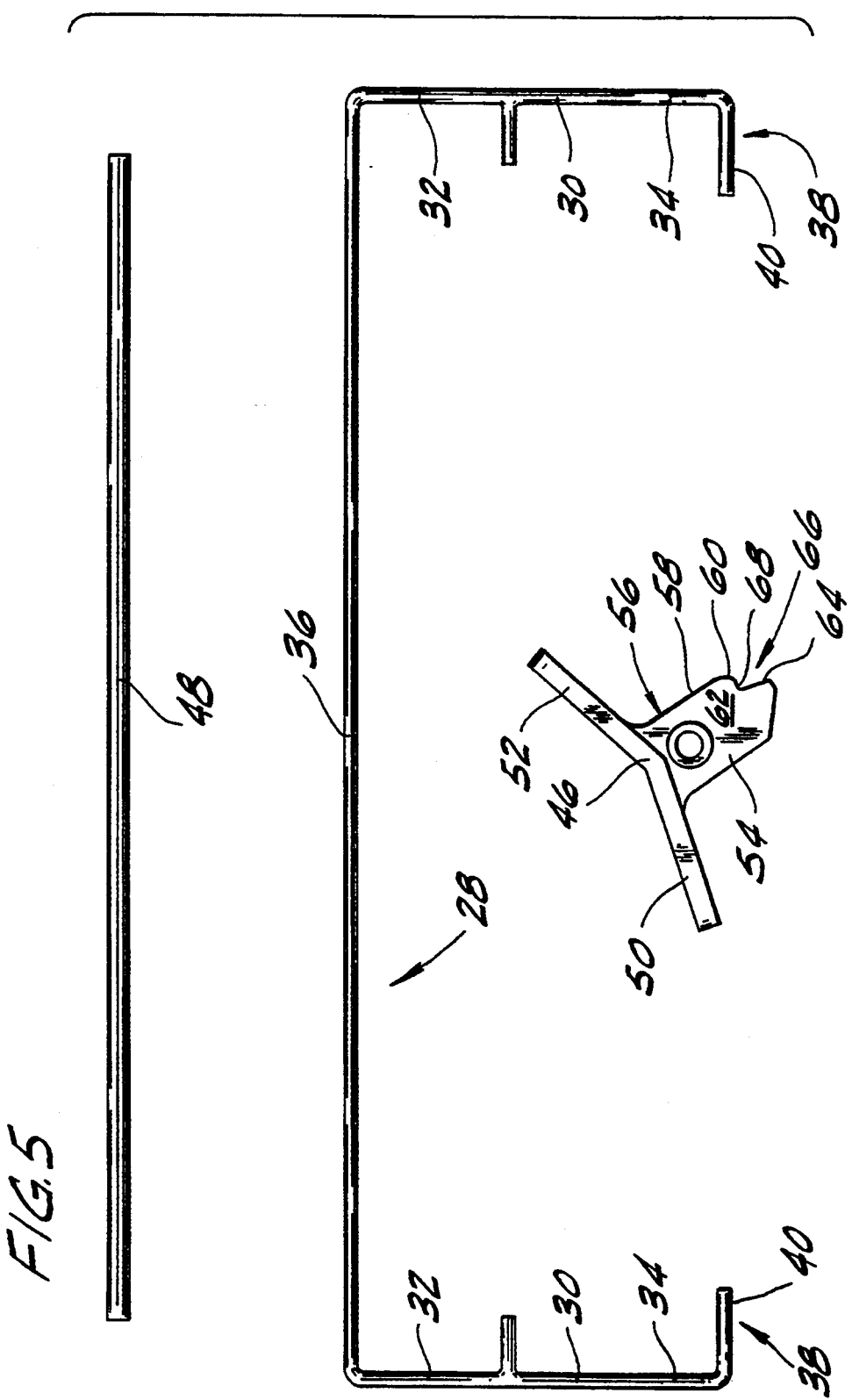
FIG. 5 is an elevation of the components of the brake assembly of the present invention.

Referring now to the drawings, a brake assembly of the present invention is indicated generally at 10. The brake assembly 10 is designed to prevent a cart, such as a standard shopping cart 12, from rolling away from the user. The shopping cart 12 is shown in FIG. 1 to comprise a frame 14 including a base 16 and two laterally spaced stanchions 18 extending upwardly generally from the rear of the base, and a basket 20 mounted on the frame for carrying articles such as groceries. A pair of rear wheels 22 are mounted for rotation on the rear of the frame 14 generally at laterally opposite sides thereof. A pair of front caster wheels 24 are mounted for rotation on the front of the frame generally at laterally opposite sides for rotation about horizontal and vertical axes. The front and rear wheels 24, 22 support the frame 14 and basket 20 for movement across a surface, such as a supermarket floor or parking lot. A handle 26 is mounted on the frame 14 for gripping to move the cart 12 across the surface.

The brake assembly 10 has a simple structure and is adapted to be easily installed on the carts during the manufacture of shopping carts or when retrofitting existing shopping carts. The brake assembly 10 comprises a brake shoe 28 made of a flexible material, such as spring steel, and has a unitary construction. The brake shoe 28 is sized and arranged for simultaneously applying a braking force to both rear wheels 22 of the shopping cart 12. The brake shoe 28 includes two elongate lever arms 30 having upper and lower end portions 32, 34. As shown in FIG. 2, the lever arms 30 are pivotably mounted at a location between their respective upper and lower end portions 32, 34 on the frame 14 at laterally opposite sides of the shopping cart 12.

The brake shoe 28 further includes an elongate actuator bar 36 extending laterally between the upper end portion 32 of the lever arms 30, and elongate wheel engaging means 38 extending laterally of the lower end portions 34 of the lever arms. The actuator bar 36 is located inobtrusively between laterally opposite sides of the shopping cart 12. The elongate wheel engaging means 38 extends laterally and is located between the laterally opposite sides of the shopping cart 12 in proximity to the rear wheels 22. It is to be understood that either of the actuator bar 36 and the wheel engaging means 38 may extend between and join the lever arms 30 for substantially conjoint pivoting motion. In the preferred embodiment, it is the actuator bar 36 which extends between and joins the lever arms 30.

The wheel engaging means 38 comprises braking bars 40 disposed for engaging a forwardly facing surface 42 of respective rear wheels 22 in the braked position. The braking bars 40 project laterally inwardly from the lower end portions 34 of respective lever arms 30. A frictionalizing material 44 is affixed to the portions of the braking bars 40 which engage the rear wheel 22 in the braked position to increase the braking efficiency of the brake assembly 10.

A pedal 46 is provided for easy, one step braking and unbraking of both of the rear wheels 22. The pedal 46 is pivotally mounted on the frame 14 by a pivot bar 48 extending between the stanchions 18 for motion between an unlocked position where the brake assembly 10 permits free rotation of the cart 12, and a locked position where the brake assembly restrains the cart from moving. Bushings mount the pedal 46 on the pivot rod 48 for pivoting of the pedal relative to the pivot rod. In the illustrated embodiment, the pedal 46 is generally V-shaped, with each arm 50, 52 of the "V" being disposed to facilitate pivoting the pedal in an opposite direction (i.e., one direction for applying the brake and one direction for releasing the brake).

A cam 54 (broadly, "linkage means") connects the pedal 46 to the actuator bar 36 of the brake shoe 28. The cam 54 is operable upon actuation of the pedal 46 to swing the brake shoe 28 on the lever arms 30 between an unbraked position in which the braking bars 40 are simultaneously spaced from the rear wheels 22 to permit free rotation of the rear wheels (FIG. 3), and a braked position in which the braking bars simultaneously engage the rear wheels and apply a braking force to restrict movement of the shopping cart 12 (FIG. 4).

In the illustrated embodiment, the cam 54 is formed as one piece with the pedal 46. The number of parts of the brake assembly 10 is reduced because the pedal 46 and the cam 54 (i.e., the linkage connecting the pedal to the brake shoe 28) are formed as one piece. Referring now to FIG. 3, the cam 54 has a forward edge 56 including a generally straight portion 58 which the actuator bar 36 is shown resting against. At its lower end 60, the straight portion 58 curves rearwardly and thence upwardly defining a thumb portion 62. Rearwardly of the thumb 62, the forward edge 56 of the cam 54 is shaped to define a recess 66 which receives the actuator bar 36 when in its locked position, as described more fully below. The recess 66 constitutes in the illustrated embodiment the "locking means" described in the claims. Thus it may be seen that the locking means (recess 66) of the present invention is also formed as one piece with the cam 54 and the pedal 46, so that locking is provided without adding additional separate parts to the brake assembly 10.

To move the brake shoe 28 to its braked position, a downward force is applied by the user's foot (not shown) to the rear arm 50 of the pedal 46, causing the pedal to pivot on the pivot bar 48 in a counterclockwise direction (as seen in FIGS. 3 and 4). The actuator bar 36 is pushed forward by its engagement with the forward edge 56 of the cam 54, and the brake shoe 28 pivots in a clockwise direction. When braking bars 40 engage their respective rear wheels 22, substantially halting the clockwise pivoting of the brake shoe 28, the actuator bar 36 is generally located at the lower end 60 of the straight portion 58. Continued counterclockwise pivoting of the pedal 46 causes the actuator bar 36 to flex in a generally downward direction as it follows the contour of the thumb 62. Eventually, the actuator bar 36 is in registration with the recess 66 and snaps into the recess (FIG. 4). The bar 36 is held in a still-flexed configuration in the recess 66 so that the resiliency of the bar provides a locking force holding the brake shoe 28 and pedal 46 from pivoting in either direction, and holds the braking bars 40 in firm engagement with the rear wheels 22 to brake the cart 12.

To unlock the brake assembly 10 and pivot it to its unbraked position, force is applied to the forward arm 52 of the pedal 46 causing the pedal to pivot in a clockwise direction. The actuator bar 36 of the brake shoe 28 engages the curved rear surface 68 of the thumb 62, and the actuator bar 36 is deflected downwardly until the actuator bar reaches the bottom 60 of the thumb. The actuator bar 36 then clears the recess 66 and returns to its fully relaxed position. At the same time the brake shoe 28 pivots in a counterclockwise direction relieving the braking force applied to the rear wheels 22.

The brake assembly 10 is mounted on the frame 14 of the shopping cart 12 so as not to interfere with the normal operation of the carts and to facilitate use of the brake assembly by the operator. The pivot rod 48 and pedal 46 are mounted on the frame 14 at a position where the pivot rod 48 and pedal 46 will not interfere with the ability of the cart 12 to be nested with another cart of the same construction. The actuator bar 36 and pedal 46 are located low enough as not to block the basket of a second cart (not shown) from being received between the stanchions 18 and partially into the basket 20 in the manner well known to the ordinary shopper. Further, the pivot rod 48 and pedal 50 are mounted at a position relative to the frame 14 where the pedal 46 is readily accessible to the user's foot. The brake shoe 28 is mounted on the base 16 so as to cause the brake shoe 28 to rest against the cam 54 with the braking bars 40 spaced away from the rear wheels 22 when the pedal 46 is in the unbraked position. This particular configuration of the brake shoe 28 positions the actuator bar 36 to be slightly spaced away toward the cam 54 from the vertical plane extending up from the axis of rotation. Accordingly, when the brake assembly 10 is in the unbraked position, the actuator bar 36 rests against the cam 54 and the braking bars 40 do not engage the rear wheels 22.

Thus it may be seen that the several objects and features of the present invention are achieved in the brake assembly disclosed 10 herein. The unitary construction of the brake shoe 28 permits it to move for simultaneously applying a braking force to both of the rear wheels 22 upon a one-step actuation by the user. As shown in FIG. 5, the brake assembly 10 consists of only three parts in the preferred embodiment, making the brake assembly of the present invention easier to install and more reliable because there are fewer independently moving parts to fail. The linkage transmitting motion of the pedal 46 to the brake shoe 28 and the locking means for holding the brake assembly 10 in a braked position are all part of the cam 54, which is itself formed as part of the pedal. The economy of parts facilitates easy attachment of the brake assembly 10 to new carts, or carts already in use.

The braking bars 40 are disposed for engaging the forward facing surface 42 of the rear wheels 22, out of the way of hands or feet which could be pinched in the operation of the brake assembly 10. The engagement of the cam 54 with the actuator bar 36 is located on the forwardly facing surface 56 of the cam, also making it difficult for appendages to be pinched by the mechanism. Moreover, the pedal 46 is located low on the cart so that it is easily reached by lifting the leg a short distance. The V-shaped construction of the pedal 46 facilitates pivoting the pedal in opposite directions by providing two flat surfaces on the arms 50, 52 of the "V" disposed for applying a force causing the pedal to pivot in different directions. The location of the brake assembly 10 also has the benefit of avoiding interference with the advantageous nesting of carts 10.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A shopping cart comprising:
   a frame including a base and two laterally spaced stanchions extending upwardly generally from the rear of the base;
   a basket mounted on the frame for carrying articles;
   a pair of rear wheels mounted for rotation on the frame generally at laterally opposite sides thereof;
   a pair of front wheels mounted for rotation on the frame generally at laterally opposite sides thereof, the front and rear wheels supporting the frame and basket for movement across a surface;
   a handle for gripping to move the shopping cart across the surface; and
   a brake assembly including a brake shoe having a unitary construction and being sized and arranged for simultaneously applying a braking force to both of the rear wheels of the shopping cart, the brake shoe including elongate lever means pivotally mounted on the frame and having upper and lower end portions, an elongate actuator bar extending generally laterally of the upper end portions of said lever means, and wheel engaging means extending generally laterally of the lower end portions of said lever means in proximity to the rear wheels;
   the brake assembly further including a pedal pivotally mounted on the frame and linkage means connecting the pedal to the actuator bar of the brake shoe, said linkage means being operable upon actuation of the pedal to swing the brake shoe on said lever means between an unbraked position in which said wheel engaging means is simultaneously spaced from both of the rear wheels to permit free rotation of the rear wheels, and a braked position in which said wheel engaging means simultaneously engages the rear wheels and applies a braking force thereto to prevent movement of the shopping cart.

2. A shopping cart as set forth in claim 1 wherein said linkage means comprises a cam engageable with the actuator bar, the cam being shaped such that upon pivoting of the pedal the actuator bar is pushed and the brake shoe swung on said lever means to said braked position.

3. A shopping cart as set forth in claim 2 wherein the cam further includes a locking means engageable with the actuator bar when the brake shoe is in said braked position for locking the brake shoe in said braked position.

4. A shopping cart as set forth in claim 3 wherein said locking means is formed as one piece with the cam.

5. A shopping cart as set forth in claim 4 wherein the cam is shaped for deflecting the actuator bar from a relaxed position, and wherein said locking means comprises a recess formed in the cam, the actuator bar being adapted upon registration with the recess to snap into the recess and be held in the recess against further pivoting motion of the brake shoe thereby to lock the brake shoe in the braked position.

6. A shopping cart as set forth in claim 5 wherein the cam is formed as one piece with the pedal.

7. A shopping cart as set forth in claim 6 wherein the brake assembly further comprises a pivot rod mounted between the stanchions of the frame, the pivot rod mounting the pedal for pivoting motion relative to the frame.

8. A shopping cart as set forth in claim 7 wherein the wheel engaging means of the brake shoe are disposed for engaging a forwardly facing surface of the rear wheels in the braked position.

9. A shopping cart as set forth in claim 8 wherein said wheel engaging portions of the brake shoe have a frictionalizing material thereon.

10. A shopping cart as set forth in claim 1 wherein said lever means comprises a pair of lever arms pivotably mounted at a location between the respective upper and lower end portions on the frame at laterally opposite sides of the shopping cart, at least one of the actuator bar and the wheel engaging means extending between and rigidly joining the lever arms for substantially conjoint pivoting motion.

11. A shopping cart as set forth in claim 10 wherein said wheel engaging means of the brake shoe comprise braking bars projecting laterally inwardly from the lower end portions of respective lever arms.

12. A shopping cart as set forth in claim 10 wherein the brake assembly further comprises a pivot rod mounted between the stanchions of the frame, the pivot rod mounting the pedal for pivoting motion relative to the frame.

13. A shopping cart as set forth in claim 12 wherein said wheel engaging means of the brake shoe are disposed for engaging a forwardly facing surface of the rear wheels in the braked position.

14. A shopping cart as set forth in claim 12 wherein said linkage means comprises a cam formed as one piece with the pedal, the cam being shaped such that upon pivoting of the pedal the actuator bar is pushed and the brake shoe swung on the lever arms to said braked position.

15. A shopping cart as set forth in claim 14 wherein the cam further includes a locking means formed as one piece with the cam, the locking means being engageable with the actuator bar when the brake shoe is in said braked position for locking the brake shoe in said braked position.

16. A brake assembly for a shopping cart having a frame, a basket mounted on the frame, front and rear wheels supporting the frame and basket for movement across a surface, and a handle for gripping to move the shopping cart across the surface, the brake assembly comprising:

a brake shoe having a unitary construction and being sized and arranged for simultaneously applying a braking force to both of the rear wheels of the shopping cart, the brake shoe including elongate lever means pivotally mounted on the frame and having upper and lower end portions, an elongate actuator bar extending generally laterally of the upper end portions of said lever means, and wheel engaging means extending generally laterally of the lower end portions of said lever means;

a pedal adapted to be pivotally mounted on the frame; and linkage means connecting the pedal to the actuator bar of the brake shoe, said linkage means being operable upon actuation of the pedal to swing the brake shoe on said lever means between an unbraked position in which said wheel engaging means is simultaneously spaced from the rear wheels to permit free rotation of the rear wheels, and a braked position in which said wheel engaging means simultaneously engages the rear wheels and applies a braking force thereto to prevent movement of the shopping cart.

17. A brake assembly as set forth in claim 16 wherein said lever means comprises a pair of lever arms adapted to be pivotably mounted at a location between the respective upper and lower end portions on the frame at laterally opposite sides of the shopping cart, at least one of the actuator bar and the wheel engaging means extending between and rigidly joining the lever arms for substantially conjoint pivoting motion.

18. A brake assembly as set forth in claim 17 wherein said wheel engaging means of the brake shoe comprises braking bars projecting laterally inwardly from the lower end portions of respective lever arms.

19. A brake assembly as set forth in claim 18 wherein the brake assembly further comprises a pivot rod mounted between the stanchions of the frame, the pivot rod mounting the pedal for pivoting motion relative to the frame.

20. A brake assembly as set forth in claim 19 wherein the braking bars of the brake shoe are disposed for engaging a forwardly facing surface of the rear wheels in the braked position.

21. A brake assembly as set forth in claim 19 wherein said linkage means comprises a cam formed as one piece with the pedal, the cam being shaped such that upon pivoting of the pedal the actuator bar is pushed and the brake shoe swung on the lever arms to said braked position.

22. A brake assembly as set forth in claim 21 wherein the cam further includes a locking means formed as one piece with the cam, the locking means being engageable with the actuator bar when the brake shoe is in said braked position for locking the brake shoe in said braked position.

23. A brake assembly as set forth in claim 22 wherein the cam is shaped for deflecting the actuator bar from a relaxed position, and wherein said locking means comprises a recess formed in the cam, the actuator bar being adapted upon registration with the recess to snap into the recess and be held in the recess against further pivoting motion of the brake shoe thereby to lock the brake shoe in the braked position.

* * * * *